Patented July 26, 1949

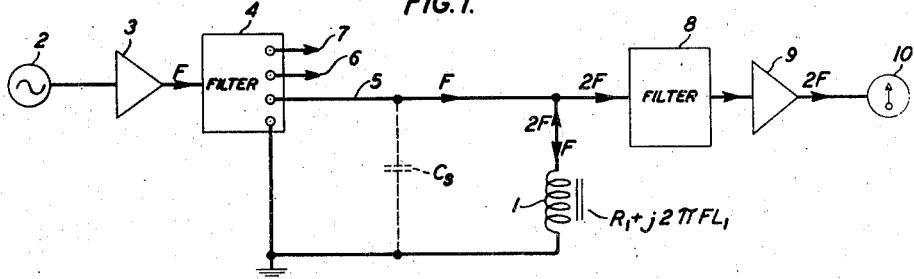
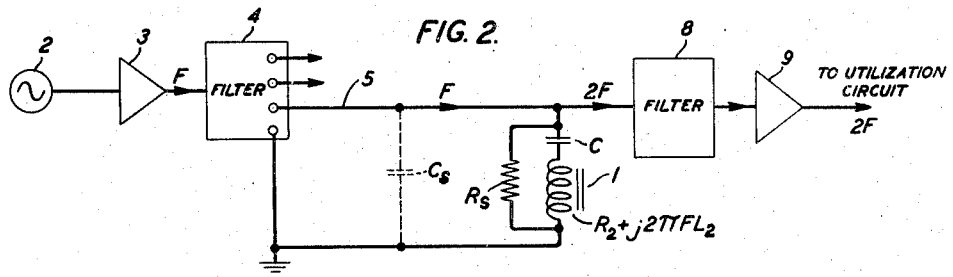
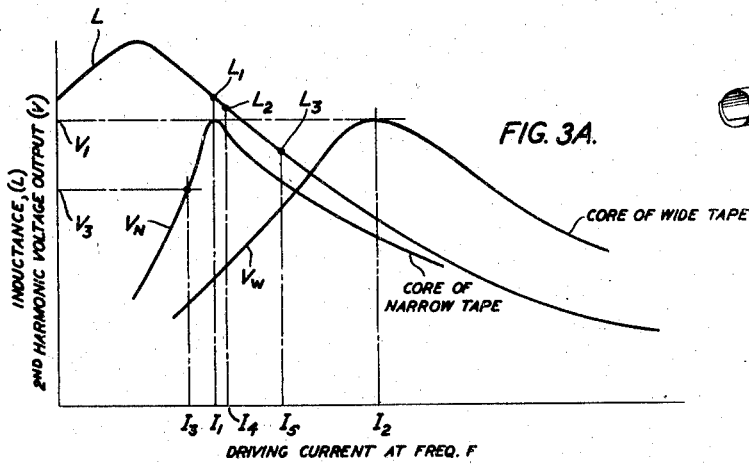
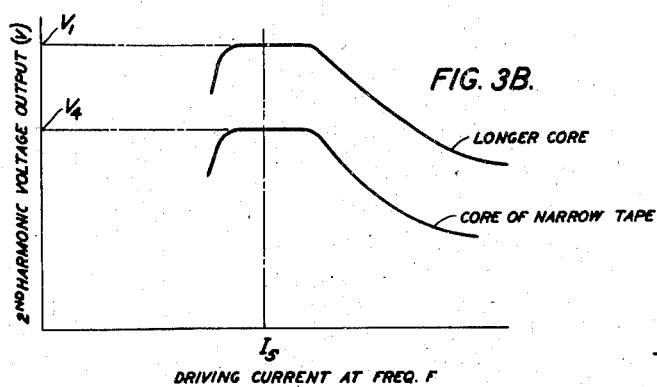

2,477,337

UNITED STATES PATENT OFFICE 2,477,337

MAGNETIC DETECTOR

William E. Kahl, West New York, N. J., assignor to Bell Telephone Laboratories, Incorporated, New York, N. Y., a corporation of New York Application July 31, 1944, Serial No. 547,394

4 Claims. (Cl. 177—351)

This invention relates to magnetic detection systems and more particularly to improvements in the exciting or driving circuit of magnetometer systems of the type employing a magnetometer comprising a core of magnetic material having windings thereon energized from a source of alternating current of fundamental frequency to generate even order harmonic voltages in the windings proportional in magnitude to the strength of the magnetic field to be measured. Such a system is disclosed in the copending patent application of E. P. Felch and T. Slonczewski, Serial No. 483,755, filed April 20, 1943, now patent No. 2,468,968, issued May 3, 1949.

The fact that such a magnetometer must be driven by a pure sine wave source of fundamental frequency makes necessary the careful filtering of the output from the driving oscillator or generator source. Most any well designed filter of the bandpass type may be employed for this purpose, but it is obvious that since the magnetometer element inherently has a large reactive impedance component, it must be included in the electrical design as part of the end section of the filter. The design problem becomes more difficult because these magnetometers are found to possess an inductance which varies as a function of the driving current. This in turn changes the pass characteristics of the filter and results in changes in the amplitudes of the even order harmonic voltages generated in the magnetometer even though the applied field strength has not changed. Other variables, as for example capacitance variations of the wiring, also enter into the problem to give it a degree of complexity difficult of accurate quantitative evaluation. Of course, it is obvious that these parts may be constructed during their manufacture so that the various component parts carefully complement one another, thereby reducing as far as possible the effect of many of the variables which may be encountered in the use of the system. This, however, places additional restrictions upon the use of the apparatus, as for example, in cases where it is desired that the magnetometer element be placed at some distance from the rest of the apparatus and coupled thereto through a cable, the capacitance of which may vary considerably due to strains which may be produced in the cable. In order that these component parts may be easily manufactured within reasonable manufacturing tolerances, it is desirable that the circuit design be based upon principles which either eliminate or render negligible these variable factors.

It is therefore the object of this invention to provide a circuit for magnetic detection systems of the type described above which is substantially insensitive to variations in magnitude of the exciting voltage of fundamental frequency, whereby the detection system is stabilized and also rendered substantially insensitive to incremental changes of wiring capacitance and changes in the inductance of the magnetometer elements.

The foregoing object is attained by this invention by providing a capacitor connected in series with the magnetometer element and a resistor connected in parallel with the series-connected capacitor and magnetometer element.

The invention may be better understood by referring to the accompanying drawings in which:

Fig. 1 discloses a magnetic detection system of the type applicable to the practice of this invention;

Fig. 2 discloses the magnetic detection system of Fig. 1 modified in accordance with this invention;

Figs. 3A and 3B disclose typical characteristic curves illustrative of this type of magnetic detection system; and Fig. 4 shows the core structure of the magnetometer which may be used in the practice of this invention.

Referring now to Fig. 1 wherein is disclosed a magnetometer 1 having a resistance $R_1$ and an inductance of $L_1$ at the fundamental frequency F. As previously stated, this magnetometer comprises a core of magnetic material having one or more windings thereon. In the particular embodiment illustrated in Fig. 1, it is assumed that only one winding is used. It is obvious, however, that more than one winding may be used as was disclosed in the copending application of T. Slonczewski, Serial No. 483,756, filed April 20, 1943. It is unnecessary to consider these other windings in order to arrive at a proper and complete understanding of the present invention as the principles set forth and developed for the single winding are obviously applicable where more than one winding is used.

The operation of this type of magnetometer element is based on the properties exhibited by magnetic material in a strong magnetic field. The flux in a magnetic material in an increasing magnetic field is proportional to the strength of the field only up to a certain critical value of field. Beyond that value the flux increases very slowly. If then a strong sinusoidal current is sent from a high impedance source through a coil with a magnetic core, the flux in the core and therefore the voltage across the coil will not be sinusoidal but will have frequency components which are harmonics of the driving frequency. In the absence of any exterior field or in the general sense any constant component of field, this distortion will be symmetrical and will contain only odd harmonics of the driving frequency. If, however, a flux induced by a unidirectional magnetic field is also present, the even order harmonics of the driving frequency will appear and their polarity will depend upon the direction of this flux. If the axis of the coil is maintained constantly in alignment with the earth's magnetic field, changes in that field caused by the presence of a mass of magnetic material will be indicated by changes in the strength of the even harmonics. Stated otherwise, if the magnetometer core is completely demagnetized and then energized or excited by a sinusoidal source of alternating magnetomotive force of sufficient magnitude to drive the induction beyond proportionality, that is, well into the range of saturation, only odd order harmonics will be generated in the winding about the magnetometer core. If, however, this magnetomotive force has a constant component so that it becomes unsymmetrical, even order harmonics will appear in addition to the odd order harmonics and these even order harmonics are found to vary in magnitude in proportion to the magnitude of the constant component of magnetomotive force. Therefore, if a magnetometer core of small cross-sectional area compared to its length is placed in alignment with a magnetic field and is excited by a sinusoidal magnetomotive force, it will generate a series of even order harmonics in any winding surrounding this core, the magnitudes whereof will be proportional to the strength of the magnetic field.

In Fig. 1. the magnetometer 1 is excited from an alternating current source schematically illustrated as an oscillator 2. The output of this oscillator is amplified by an amplifier 3 and passed through a band-pass filter 4. In order that alternating current source 2 may excite three magnetometers in the manner more particularly illustrated in the above-cited copending application of Felch-Slonczewski, filter 4 may have three output channels 5, 6 and 7. For the purposes of this invention it is unneccessary to describe other than one of these channels. The exact construction of filter 4 is unimportant to the understanding of this invention as it may comprise most any band-pass filter capable of passing currents of fundamental frequency F from the alternating current source 2. It will be noted by referring to Fig. 1 that this voltage of fundamental frequency causes an exciting current to pass through the magnetometer element 1. It may be assumed that a constant field component is being applied to the magnetometer element 1 along the direction of its principal axis thereby causing even order harmonic voltages to be generated in the winding. Any one of these even order harmonic voltages may be selected for detection. To illustrate the invention the second harmonic of frequency 2F is selected by a band-pass filter 8 which rejects the voltage of fundamental frequency coming from filter 4 but readily passes the second harmonic which is amplified by ampifier 9 and passed on to some utilization means as for example indicator 10.

It very often happens in the practice of the magnetic detection art that the magnetometer element 1 must be placed at a location somewhat remote from the driving source and indicator. This is customarily accomplished through the connection of a cable which obviously must have some capacitance between conductors as represented in Fig. 1 by the capacitor $C_s$. In some applications the cable is subject to variable mechanical strains producing corresponding variations in this stray capacitance which has been found to result in false indications of changing field strength.

As previously mentioned the magnetometer element 1 contains a reactive component due to its inductance $L_1$. This inductance varies as a function of the exciting current of fundamental frequency coming from the oscillator 2. Consequently the oscillator must be rather closely regulated for volume output as these exciting current variations result in spurious variations of magnitude in the even order harmonic generated. Since the magnetometer does have a reactive component, it is obvious to those skilled in the art that its inductive reactance must be included as a factor in the design of the end elements of the band-pass filter 4. Because the slight variations of the exciting current also cause inductance variations in the magnetometer, the band-pass characteristics of filter 4 will vary, thereby accentuating the false even order harmonic response which may be received from the magnetometer element. Where it is desired to increase the sensitivity of these magnetic detection systems to changes in the field strength in the order of one gamma or less, it is obvious that such extraneous and spurious variations as are introduced by variations in the exciting current or cable capacitance must be eliminated or otherwise rendered negligible in their effects.

In the study of this problem, it was thought that if the magnetometer element were series tuned with a capacitor so that this tuned circuit will present a substantially pure resistance to the filter 4, the small variations of driving current or cable capacitance might be minimized in their effect on the magnitudes of the even order harmonic voltages generated. Due to the many circuit variables involved the problem is not quite as simple as just presented but as will be hereinafter more fully described, the circuit modified in this manner proved greatly superior to the circuit without the modification.

The modified circuit is shown in Fig. 2. In this figure similar circuit components bear the same reference numerals as their corresponding parts in Fig. 1. Since the magnetometer element 1 is substantially series tuned by capacitor C and is shunted by a resistor $R_s$ to form the network shown in Fig. 2, this network is made to appear substantially as a resistance to the output section of the filter 4. Consequently the end section of filter 4 may be built out without consideration of the reactive elements in the magnetometer network.

The manner in which the various component parts of the magnetometer network shown in Fig. 2 may be proportioned may be better understood by referring first to Figs. 3A and 3B. The curves shown in Fig. 3A are typical characteristic curves of magnetometers connected as shown in Fig. 1 wherein no series capacitor and shunt resistor are used. In this figure it will be seen that the inductance and the second harmonic voltage output response of the magnetometer are plotted as functions of the driving current of fundamental frequency F. The voltage response curves $V_N$ and $V_W$ were taken from magnetometers having the same length of core, these cores when completed also having the same over-all cross-sectional area, that is, the same outside diameter. Each core is rolled from a thin strip of Permalloy tape into the form of a scroll, the principal axis of the scroll being parallel with the length of the tape from which it was rolled as shown in Fig. 4. Thus, the number of convolutions in the finished scroll is determined by the width of the tape. The response curve for the narrow tape core labeled $V_N$ is obtained from a magnetometer rolled from a narrow strip of Permalloy tape while the curve labeled $V_W$ is from a magnetometer rolled from a wider strip. It should be noted that the peak of the curve $V_N$ is relatively narrow. The exciting current may be set at any arbitrary value which produces saturation, as, for example, $I_3$, and with the magnetometer immersed in a field of predetermined constant strength a second harmonic output of voltage $V_3$ will be obtained. It is evident that should the driving current vary, the voltage response from the magnetometer will correspondingly vary while the field strength remains constant. This is an obviously undesirable characteristic. If the driving current is set at a different value equal to $I_1$, the second harmonic voltage output will be $V_1$ and since this is at the peak of the characteristic, slight changes in driving current will produce only relatively small variations in output voltage. This may be further minimized by using a core rolled from a wider strip of Permalloy tape. Due to the greater amount of material in this core, however, a larger driving current will be required, as for example, current $I_2$ shown in Fig. 3A. While this is a considerable waste of energy, it will be noted that larger variations of exciting current may be tolerated without increasing the variations of second harmonic output voltage. It necessarily follows that if the width of the core tape is increased, greater stability may be realized but at the expense of a greater amount of energy consumption to excite the core.

Referring again to Fig. 3A, a typical inductance curve $L$ plotted as a function of the driving current of fundamental frequency $F$ is also shown. It will be noted that for the core of narrow tape driven with a driving current of $I_1$, the inductance will have a value $L_1$, but that should this current be increased slightly to a value such as $I_4$, the inductance will decrease to a value $L_2$. This results in a shift in the band-pass characteristics of filter 4 and a further variation in the second harmonic voltage output from the magnetometer element.

Referring now to Fig. 3B where the characteristic curves of the magnetometer element made into the network in accordance with this invention are disclosed. As previously stated the narrower the tape in the core, the smaller the amount of driving energy required to excite it. Consequently, these curves are made up on the basis of the dimensions of the narrow tape core of Fig. 3A. If a condenser C is connected in series with the magnetometer I, as shown in Fig. 2 and the capacity of this condenser is chosen to be such as would resonate this magnetometer, assuming it to have an inductance $L_1$ corresponding with the driving current $I_1$, as shown in Fig. 3A, and this series circuit be shunted by a resistance $R_s$, the value of which is approximately equal to the resistance $R_2$ of the magnetometer I of Fig. 2, the lower of the two response curves labeled "Core Narrow Tape" as shown in Fig. 3B will be obtained. It will be noted that the top of this curve is considerably flattened as compared with the curve $V_N$ of Fig. 3A and consequently considerable variation of the driving current may be tolerated without any material variation in the second harmonic voltage output. It has been found that this does not affect the linearity of response between field strength and the generated even order harmonic voltages nor does it reduce the sensitivity of the magnetometer to a changing field strength, but it does greatly stabilize the magnetometer with respect to variations in the driving current. In order to get the maximum benefit from such a flat-top curve, the current should be increased to a value $I_5$ located about midway of the flat top. By referring again to Fig. 3A, it will be noted that this driving current $I_5$ corresponds with an inductance $L_5$ so that the magnetometer actually has an inductance of value $L_5$ rather than $L_1$ which was used to arrive at a suitable value for the capacitance of condenser C.

It has been found experimentally that if the value of condenser C is obtained in the manner indicated, considerable deviation from this capacitance can be tolerated without losing any material benefits from this invention. It has also been found that if this capacitance be either increased or decreased to too great an extent, the width of the flat top of the curve as shown in Fig. 3B will become narrower. Also considerable latitude in the value of resistance $R_s$ may be tolerated without any great loss of the benefits of this invention. The value of this resistance should not be so small as to require too much energy from the oscillator source. Also it should not be so large as to lose the broadening effect secured by its use. In any case the parallel resistance of $R_s$ and $R_2$ should approximate the required terminating impedance for filter 4. It has been found experimentally that a value of resistance approximately equal to the resistance of the magnetometer element is of satisfactory size.

Referring again to Fig. 3B it will be noted that the voltage response $V_4$ from the narrow tape core is considerably lower than the maximum voltage response $V_1$ which is obtained from the magnetometer without this circuit network. This is easily made up by increasing the length of the core slightly to increase the magnitude of the even order harmonic voltage response. It has been found that the amount of energy required to drive this longer core is still considerably less than would be required to drive the wide tape core to produce the characteristic $V_W$ shown in Fig. 3A and a considerably higher degree of stabilization is secured. Moreover, the fact that a shunting resistance $R_s$ which is relatively small compared with the reactance of the cable capacity $C_s$ renders variations in this cable capacitance negligible.

While the invention has been described with the various component parts of the magnetometer network proportioned in a particular manner to derive optimum results, experiments have shown that considerable latitude in these values may be tolerated and still secure very beneficial results. Consequently the invention is not limited in scope to the particular relationship of values indicated above.

What is claimed is:

1. In a magnetic detection system of the type employing a magnetometer comprising a core of magnetic material having windings thereon energized from a source of alternating current of fundamental frequency to generate even order harmonic voltages in the windings proportional in magnitude to the strength of the magnetic field to be measured, the detector circuit comprising a source of alternating current of fundamental frequency, a magnetometer having an exciting winding of known inductance and effective resistance at the fundamental frequency, a capacitor connected in series with said winding, the capacitance whereof being of magnitude tending to approximately tune the known inductance to resonance with currents of fundamental frequency, a resistor of resistance approximating said effective resistance connected in shunt to said series connected winding and capacitor, said winding, capacitor and resistor comprising a magnetometer network, and circuits connecting said network to the alternating current source.

2. In a magnetic detection system of the type employing a magnetometer comprising a core of magnetic material having windings thereon energized from a source of alternating current of fundamental frequency to generate even order harmonic voltages in the windings proportional in magnitude to the strength of the magnetic field to be measured, the detector circuit comprising a source of alternating current of fundamental frequency, a magnetometer having an exciting winding, the inductance and effective resistance values whereof are known for an exciting current of fundamental frequency corresponding with the maximum preselected even order harmonic voltage generated in said winding, a capacitor connected in series with said winding, the capacitance whereof substantially series tunes said known inductance value to currents of the fundamental frequency, a resistor of resistance substantially equal to said known effective resistance connected in shunt to said series connected winding and capacitor, said winding, capacitor and resistor comprising a magnetometer network, and circuits connecting said network to the alternating current source.

3. In a magnetic detection system of the type employing a magnetometer comprising a core of magnetic material having windings thereon, energized from a source of alternating current of fundamental frequency to generate even order harmonic voltages in the windings proportional in magnitude to the strength of the magnetic field to be measured, the detector circuit comprising a source of alternating current of fundamental frequency, a magnetometer having an exciting winding of known inductance and effective resistance at the fundamental frequency, a capacitor connected in series with said winding, the capacitance whereof being of magnitude tending to approximately tune the known inductance to resonance with currents of fundamental frequency, a resistor of resistance approximating said effective resistance connected in shunt to said series connected winding and capacitor, said winding, capacitor and resistor comprising a magnetometer network, circuits connecting said network to the alternating current source and terminals on said network for connection to a utilization means.

4. In a magnetic detection system of the type employing a magnetometer comprising a core of magnetic material having windings thereon, energized from a source of alternating current of fundamental frequency to generate even order harmonic voltages in the windings proportional in magnitude to the strength of the magnetic field to be measured, the detector circuit comprising a source of alternating current of fundamental frequency, a magnetometer having an exciting winding, the inductance and effective resistance values whereof are known for an exciting current of fundamental frequency corresponding with the maximum preselected even order harmonic voltage generated in said winding, a capacitor connected in series with said winding, the capacitance whereof substantially series tunes said known inductance value to currents of the fundamental frequency, a resistor of resistance substantially equal to said known effective resistance connected in shunt to said series connected winding and capacitor, said winding, capacitor and resistor comprising a magnetometer network, circuits connecting said network to the alternating current source and terminals on said network for connection to a utilization means.

WILLIAM E. KAHL.

REFERENCES CITED

The following references are of record in the file of this patent:

UNITED STATES PATENTS

| Number | Name | Date |
| --- | --- | --- |
| 2,016,977 | Thomas | Oct. 8, 1935 |
| 2,053,154 | La Pierre | Sept. 1, 1936 |
| 2,252,059 | Barth | Aug. 12, 1941 |
| 2,415,808 | Buckley | Feb. 18, 1947 |